Oct. 15, 1946.  C. E. ANNETT, 2D., ET AL  2,409,180
FASTENING DEVICE
Filed March 21, 1944
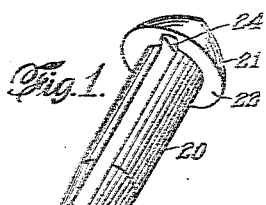
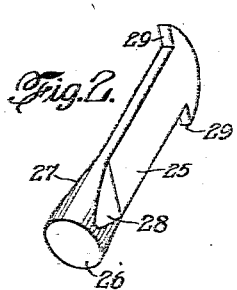
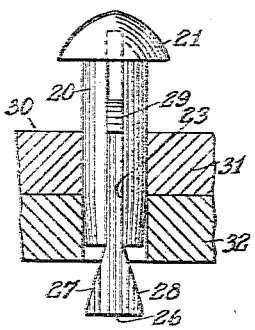
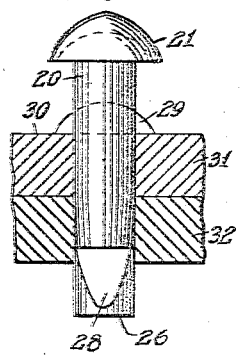
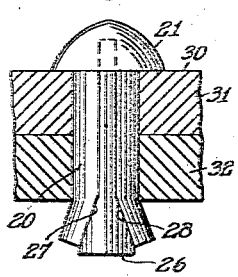
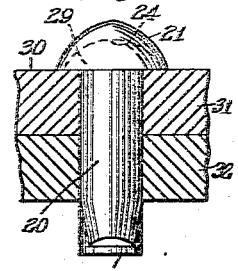
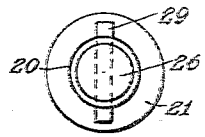
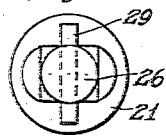
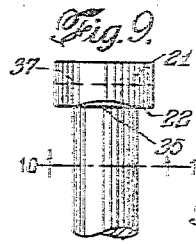
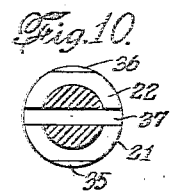
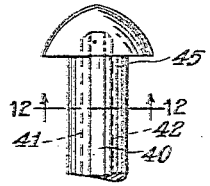
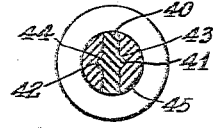
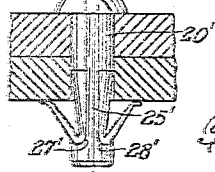
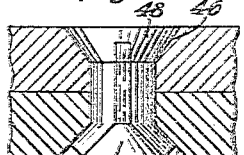
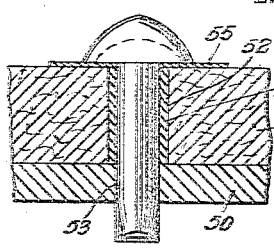
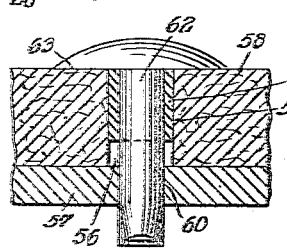
INVENTORS
CHARLES E. ANNETT, 2ND.
BY AND MALCOLM ARMSTRONG
ATTORNEY Patented Oct. 15, 1946

2,409,180

UNITED STATES PATENT OFFICE 2,409,180

FASTENING DEVICE

Charles E. Annett, 2d, and Malcolm Armstrong, Short Hills, N. J.; said Armstrong assignor to said Annett Application March 21, 1944, Serial No. 527,390

11 Claims. (Cl. 85—38)

The invention relates to fastening devices of a self-heading nature or cold rivet type suitable for holding two overlapping members or plates in assembled relation through positioning of the novel fastening device in registering holes of the members it is desired to join; and which device may be used as a so-called "blind rivet" requiring no backing-up tool against one end for the opposite end in being upset or peened over to secure the rivet.

An object of the invention is to provide a novel arrangement of rivet element and wedge pin element of simple construction and ready manufacture.

Another object of the invention is to provide a fastening device or rivet of this nature in which full strength of material in shear is developed.

Another object of the invention is to provide a novel rivet which will drive properly even if the holes in the members to be united are not positioned exactly coaxial.

Another object of the invention is to provide a fastening device of the nature set forth which will require no special tool to head the rivet, this being effected, for example, by the use of an ordinary hammer with or without a die tool.

Still another object is to provide a fastening device which may be used as a so-called "blind rivet" where access to both ends of the fastening device is not possible and all operations on the fastening device must be performed at the surface of the work from which the device is inserted.

The invention has for a further object to provide a fastening device wherein the head of the rivet element may be made to resemble the usual toroidal form of rivet head and afford thereby a suitable weather seal.

Another object of the invention is to provide a fastening device including a wedge pin element which is of substantially flat shape rather than of a cylindrical form, as is the usual practice.

Another object of the invention is to provide for the retention of such wedge pin element in a manner that it will not work loose or become detached from the cooperating rivet portion when the latter member is once upset.

Another object of the invention is to provide a two-element fastening device of the nature set forth wherein the elements composing the same may be shipped in assembled relation with wedge pin in set position, the elements being firmly held together and immediately ready for use.

Another object of the invention is to provide a fastening rivet element having a bifurcated shank portion of substantially cylindrical form for ready insertion into the parts to be joined, the associated wedge pin element affording a wedge portion which tends not only to tighten the fastening device as a whole when joining the members to be united but will also tend to draw these members together.

A still further object of the invention is to provide a fastening device of the nature set forth suitable for withdrawal by means of a claw hammer, the claws of which may be located beneath the undersurface of the head of the rivet element of the fastening device in diametrically disposed countersunk or cut-away portions therein which accommodate the said claws.

In carrying out the invention, the fastening device is composed of two normally separable elements, a rivet element proper and a wedge pin element designed to be received in a diametral kerf of the cylindrical shank of the rivet element, said kerf extending inwardly from the outer end of the shank into the head of the rivet to provide a recess therein. The wedge pin is substantially flat throughout its length except at the outer end which is cylindrical to conform substantially to the contour of the shank of the rivet element, both surfaces tapering preferably toward the outer end for expediting insertion of the fastening member when the holes of the members to be joined thereby are slightly out of registry. The cylindrical end of the pin element tapers inwardly respectively to the corresponding flat surfaces of the pin element to provide thereby a pair of wedge portions designed to engage with and deflect outwardly the free outer ends of the tines of the bifurcated shank of the rivet element in setting the rivet.

The flat surfaced portion of the pin element is adapted to fit the kerf of the rivet element and at its inner end is provided with a head or flange designed to seat in the recess of the head of said rivet element when the rivet is set, the flange overhanging the shank for contact with the uppermost surface of the members to be united to prevent pushing through of the wedge pin element which is caused thereby through its wedge portions to spread the outer ends of the respective tines projecting beyond the lowermost surface of the members to be united. When the fastening device is fully set, the said flange will be accommodated in the recess of the head of the rivet element, both shouldering against said uppermost surface of the members to be joined while the wedge portions of the wedge pin engage respectively the outer ends of the tines of the shank of the rivet element and force them against said lowermost surface of the members.

The nature of the invention, however, will best be understood when described in connection with the accompanying drawing, in which:

Fig. 1 is a view in perspective of the rivet element of the novel fastening device; and Fig. 2 is a similar view of the associated wedge pin element.

Fig. 3 is a front elevation of the assembled fastening device, and Fig. 4 a side elevation thereof showing the fastening device located in position for uniting two plates which are shown in vertical section.

Fig. 5 is an underneath view of the assembled fastening device shown in Fig. 3.

Figs. 6 and 7 are respectively a front elevation and a side elevation illustrating the fastening device after being set to join together two plates which are shown in vertical section.

Fig. 8 is an underneath view of the set fastening device shown in Fig. 6 with plates omitted.

Fig. 9 is a fragmentary view, in elevation, illustrating a modification in the rivet element; and Fig. 10 is a transverse section taken on the line 10—10, Fig. 9, looking in the direction of the arrows.

Fig. 11 is a fragmentary view in elevation, illustrating a further modification in the fastening device; and Fig. 12 is a transverse section taken on the line 12—12, Fig. 11, looking in the direction of the arrows.

Fig. 13 is a front elevation of the fastening device set flush with the two plates joined together thereby, the plates being shown in vertical section.

Fig. 14 is a view in elevation illustrating a modified form of the fastening device.

Fig. 15 and 16 are views in side elevation illustrating modifications in the fastening device as applied to the joining of plates of different materials, said plates being shown in vertical section.

Referring to the drawing, the fastening device comprises two normally separable elements, as indicated in Figs. 1 and 2, one of the elements being in the nature of a rivet element including a shank 20, substantially cylindrical, and having a head 21 of greater diameter than the shank to afford a shoulder 22, said head being indicated as of substantially the customary toroidal conformation. The shank is longitudinally slotted inwardly from its outer end to provide a diametral kerf 23 which extends into the head 21 to provide therein a recess 24.

Within the kerf 23 is designed to fit snugly a wedge pin element 25 which is of approximately the length of the kerf and is substantially flat throughout its length except at the outer end 26 which is cylindrical to conform substantially to the general contour of the rivet element shank when the two elements are assembled for uniting plate members or the like. Both of these surfaces are preferably tapered toward the outer end of the fastening device to expedite insertion of the same into the holes of the plates to be joined thereby when these holes are slightly out of registry. Cylindrical portion 26 is also beveled inwardly respectively to the corresponding flat surfaces of the pin element to provide a pair of wedge portions 27 and 28, respectively, which are designed to deflect outwardly the outer ends of the tines of the bifurcated rivet element, said tines being bendable and more or less resilient.

In addition, the wedge pin element at its end opposite the cylindrical portion 26 is flanged or provided with shoulder-forming lateral extensions 29 designed to engage the uppermost surface of a set of plates or like members to be united by the fastening device. For example, as indicated in Figs. 3 and 4, the shoulder 29 is shown as resting upon the uppermost surface 30 of the upper plate 31 which is to be united to the plate 32 by means of said fastening device.

This is accomplished, after inserting the assembled fastening device in registering holes of the respective plates, by exerting pressure upon the head 21 of the rivet element 20, for example by striking it with a hammer. This drives the rivet element 20 through the corresponding registering openings of the plates 31, 32, thereby telescoping the two elements; and as the rivet element is forced inwardly, the protruding free ends of the tines thereof will contact the wedges 27 and 28 and be deflected or peened over thereby, for example, toward the lowermost surface of plate 32 until they assume substantially the positions indicated in Figs. 6 and 7.

In this position, it will be noted that flange 29 of the wedge pin element occupies the recess 24 and the shoulder 22 of the head 21 is in contact with the uppermost surface 30 of plate 31. The two plates 31 and 32 are thus securely joined and it will be appreciated that this has been effected solely by action at one end of the fastening device and exteriorly of the work, namely: through exerting pressure upon the head 21.

The wedge or clinching pin thus is held against working loose not only through its flange engagement but as a result of the action of the wedge portions 27 and 28 of the pin jamming it in the holes of the plates; and the plates will therefore remain firmly joined once the tines of the rivet element of the fastening device have been upset. Should one or both of the plates be slightly buckled, the action of the wedges in riveting them together will also tend to draw the plates into contact, bringing their juxtaposed surfaces together.

The novel fastening device, also, may be provided in assembled relationship as for shipping purposes, since the pin element fits snugly in the kerf between the tines which are more or less resilient, and the device will thus be ready for insertion into the holes of the plates or like members to be joined by driving in the rivet element, as hereinbefore described.

In order to provide for withdrawal of a fastening member, this can be effected only by exerting pressure beneath the head 21; and where it might be desirable to provide for withdrawal of a rivet, this may be effected by laterally grooving the underface 22 or shouldering portion of the rivet element head 21 upon opposite sides of the shank portion of the rivet. For example, as indicated in Figs. 9 and 10 of the drawing, two diametrically undercut portions 35 and 36 may be provided at opposite sides of the recess 37 and substantially parallel thereto, extending to the periphery of the head. The undercut portions 35 and 36 will allow of the introduction of the claws of a claw hammer to pry apart the rivet elements through straightening of the tines of the pin element, as will be readily understood.

A further modification is indicated in the Figs. 9 and 10 in that the recess 37 is in the nature of a channel extending entirely across the undersurface of the head. This, of course, does not afford the weather-tight embodiment illustrated in Figs. 3 and 4, but may facilitate the manufacture of the rivet element. The fastening device in this embodiment, as in the case of the previously described embodiment, presents at its drive end a substantially smooth and unbroken surface, no lines of division being discernible to the eye except on very close inspection, in the case of the latter embodiment.

A still further modification in the construction of the elements of the fastening device is indicated in Figs. 11 and 12, wherein the flat portion of the wedge pin element 40 is provided on each of its surfaces with a longitudinal ridge or rib 41 and 42, respectively, designed to fit in corresponding grooves 43 and 44, respectively, of the inner surfaces of the tines of rivet element 45. This will serve to further insure the location of the pin element in the rivet element in their assembled relationship.

The novel fastening device lends itself also to mounting of the device with its opposite ends flush with the exposed surfaces of the plate members to be joined thereby. This requires merely counterboring the holes 46 and 47 at said exposed surfaces, Fig. 14, and correspondingly shaping the rivet element head 48 and the outer end 49 of the wedge pin element, the fastening device being of a length such that it will fit wholly within the registering holes and their countersunk portions.

For certain purposes, and where the rivet element of the fastening device may be constructed, for example, of sufficiently malleable metal, the tines thereof may be rolled back against the under side of the lowermost plate, as indicated in Fig. 13. To this end, the wedge surfaces 27' and 28' are more or less inturned, as shown, and the elements 20' and 25' are accordingly increased in length over those of the corresponding elements of the embodiments shown in Figs. 1 to 12, hereinbefore described. The tines of the rivet element 20' also are to be reduced in cross-section toward their respective outer ends.

Where it is desired to joint plates or the like of different materials, for example a metal plate 50 and a plate 51 of wood, plastic, or composition, Figs. 15 and 16 of the drawing, the latter plate is preferably provided with a hole 52 of somewhat larger diameter than that of the registering hole 53 of the metal plate 50; and a sleeve 54 of suitable material such as metal or plastic is located therein about the shank of the rivet element. This sleeve serves to prevent crushing of the material of plate 51 when driving the rivet element, and a washer 55 is preferably located under the head of said rivet element. As shown in Fig. 16, the flange 56 of the wedge pin is designed to shoulder against the lower metal plate 57, the other plate 58 not being of substantial material. The kerf in the rivet element element need not then be extended to the head of said element, but the diameter of the hole 59 in the plate of relatively nonsubstantial material is again made larger than that of the registering hole 60 in the metal plate, and a sleeve 61 is provided about the shank 62 of the rivet element to occupy then the space between the flange 56 and the shoulder 63 of the rivet element head, as indicated, and to serve to transmit pressure from the head of the rivet element to the pin element.

We claim:

1. A fastening device, comprising a cylindrical shank rivet element having a diametral kerf of predetermined depth extending inwardly from one end, and a flat drive-pin element adapted to fit the kerf and provided at one end with a relatively thin flange affording a flat contact shoulder extending laterally from an edge thereof beyond the periphery of the shank and at the opposite end terminating in enlarged portions receding to the respective faces of the pin element, the distance from the junction of a said receding portion with the corresponding face to the shoulder of the flange being substantially less than the depth of the kerf of the rivet element, whereby when the two elements are telescoped the outer ends of the rivet element will be deflected through contact with the respective receding portions of the pin element.

2. A fastening device, comprising a rivet element with cylindrical shank having a head portion at one end and provided with a diametral kerf extending from the opposite end of the shank into said head portion, and a substantially flat drive-pin element terminating at one end in a relatively thin flange affording a flat contact shoulder extending laterally from an edge of its body portion beyond the periphery of the shank, said flange being adapted to fit snugly the kerf of the rivet element and said pin element terminating at its other end in enlarged portions receding a relatively short distance from said end respectively to the opposite faces of the pin element for engagement respectively with the free ends of the tines of the bifurcated shank when the two elements are telescoped.

3. A fastening device, comprising a rivet element with cylindrical shank having an enlarged head portion at one end and provided with a diametral kerf extending from the opposite end of the shank into said head portion, and a substantially flat drive-pin element terminating at one end in a relatively thin flange affording a flat contact shoulder extending laterally from an edge of its body portion beyond the periphery of the shank and of the same thickness as said body portion, the latter and said flange being adapted to fit snugly the kerf of the rivet element and the flange to fit into the kerf of the head portion thereof to an extent such that the flat contact shoulder of the flange is substantially flush with the plane of the under face of the rivet head when the rivet and pin elements are telescoped, and said pin element terminating at its other end in enlarged portions receding a relatively short distance from said end respectively to the opposite faces of the pin element for engagement respectively with the free ends of the tines of the bifurcated shank when the two elements are telescoped.

4. The fastening device of claim 1, wherein the length of the pin element is substantially equal to the depth of the kerf of the rivet element.

5. The fastening device of claim 1, wherein the flange extends laterally from both of the edges of the pin element.

6. The fastening device of claim 1, wherein the rivet element is provided with a head at one end into which the kerf extends to provide a recess therein for the flange of the drive-pin element.

7. The fastening device of claim 1, wherein the rivet element is provided with a head at one end into which the kerf extends to provide a recess therein for the flange of the drive-pin element, and the head is substantially toroidal and enlarged to enclose the kerf therein.

8. The fastening device of claim 1, wherein the rivet element is provided with an enlarged head at one end into which the kerf extends to provide a recess therein for the flange of the drive-pin element, and said kerf is continued laterally through the head of the said rivet element to provide a diametral groove therethrough.

9. The fastening device of claim 1, wherein the shank of the rivet element is of cylindrical contour and the edges of the pin element and the end enlargements thereof are of like contour adapted to lie flush with the adjacent cylindrical surfaces of the shank of said rivet element when the pin element is inserted in the kerf thereof.

10. The fastening device of claim 1, wherein the rivet element is provided at one end with an enlarged head, the undersurface of which is grooved laterally upon opposite sides of the rivet element.

11. The fastening device of claim 10, wherein the kerf in the head portion of the rivet element conforms to the contour of the flanged end of the drive-pin element and accommodates the same to permit its shoulder and the under face of the rivet head to contact a work surface when the fastening device is applied thereto.

CHARLES E. ANNETT, 2ND.
MALCOLM ARMSTRONG.